US012282814B1

(12) United States Patent
Tyler

(10) Patent No.: US 12,282,814 B1
(45) Date of Patent: Apr. 22, 2025

(54) INTELLIGENT AND AUTOMATED RFID-BASED CONTROL SYSTEM FOR A DISPLAY

(71) Applicant: STARBUCKS CORPORATION, Seattle, WA (US)

(72) Inventor: Robert Joseph Tyler, Bainbridge Island, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/968,456

(22) Filed: Dec. 4, 2024

(51) Int. Cl.
*G06K 19/07* (2006.01)
*G06K 19/077* (2006.01)

(52) U.S. Cl.
CPC ..... *G06K 19/0728* (2013.01); *G06K 19/0716* (2013.01); *G06K 19/07766* (2013.01)

(58) Field of Classification Search
CPC ........... G06K 19/0728; G06K 19/0716; G06K 19/07766
See application file for complete search history.

(56) References Cited

U.S. PATENT DOCUMENTS

| | | | |
|---|---|---|---|
| 10,789,633 B2 | 9/2020 | Zises et al. | |
| 10,860,995 B2 | 12/2020 | Kelly et al. | |
| 11,120,498 B2 | 9/2021 | Chen et al. | |
| 11,176,770 B2 | 11/2021 | Ambauen et al. | |
| 11,783,682 B2 | 10/2023 | Zalewski et al. | |
| 11,928,941 B2 | 3/2024 | Rosburg et al. | |
| 12,039,487 B2 | 7/2024 | Morgan et al. | |
| 12,112,293 B2 | 10/2024 | Savage et al. | |
| 2006/0085266 A1 | 4/2006 | Wei et al. | |
| 2010/0125362 A1* | 5/2010 | Canora | G06Q 20/327 235/487 |
| 2011/0168775 A1 | 7/2011 | Van Zetten | |

(Continued)

FOREIGN PATENT DOCUMENTS

| | | |
|---|---|---|
| JP | 2004154346 A | 6/2004 |
| WO | 9964974 A1 | 12/1999 |

OTHER PUBLICATIONS

J. F. Kreutzer, R. Schmid, S. M. F. Reimer, T. C. Lueth and L. T. D'Angelo, "Radio frequency identification based detection of filling levels for automated monitoring of fluid intake," 2014 IEEE International Conference on Robotics and Biomimetics (ROBIO 2014), Bali, Indonesia, 2014, pp. 2049-2054 (Year: 2014).*

*Primary Examiner* — Matthew Mikels
(74) *Attorney, Agent, or Firm* — Kilpatrick Townsend & Stockton LLP

(57) ABSTRACT

In one example, a processor can receive a first sensor signal from an RFID reader indicating that a container is within range of an RFID reader. In response, the processor can transmit a first control signal to the display for causing an identifier for the container to be output on a display. Next, the processor can receive a second sensor signal from the RFID reader indicating that the container is not within the range of the RFID reader. In response, the processor can transmit a second control signal to the display for causing the identifier to be removed from the display. Next, the processor can receive a third sensor signal from the RFID reader indicating that the container is again within the range of the RFID reader. In response, the processor can transmit a third control signal to the display for causing the identifier to again be output on the display.

20 Claims, 5 Drawing Sheets

(56) References Cited

U.S. PATENT DOCUMENTS

| | | |
|---|---|---|
| 2020/0167850 A1 | 5/2020 | Sullivan et al. |
| 2020/0383499 A1 | 12/2020 | Ting et al. |
| 2021/0215329 A1 | 7/2021 | Callahan |
| 2022/0139146 A1 | 5/2022 | Wallis |
| 2023/0267406 A1 | 8/2023 | Adams et al. |
| 2023/0364284 A1 | 11/2023 | Sperry et al. |
| 2023/0406688 A1 | 12/2023 | Segiet et al. |
| 2024/0257020 A1 | 8/2024 | Kruger |
| 2024/0296416 A1 | 9/2024 | Johnson et al. |

\* cited by examiner

INTELLIGENT AND AUTOMATED RFID-BASED CONTROL SYSTEM FOR A DISPLAY

TECHNICAL FIELD

The present disclosure relates generally to display systems. More specifically, but not by way of limitation, this disclosure relates to an intelligent and automated radio frequency identification (RFID)-based control system for a display.

BACKGROUND

A display system can include a control system and a display, such as a liquid crystal display or a light emitting diode (LED) display. The display is normally positioned in a location for viewing by one or more viewers. The control system can control the content of the display. Over time, the control system can modify the content of the display based on various factors. To update the display content, the control system can transmit control signals to the display.

DETAILED DESCRIPTION

Figure 1:
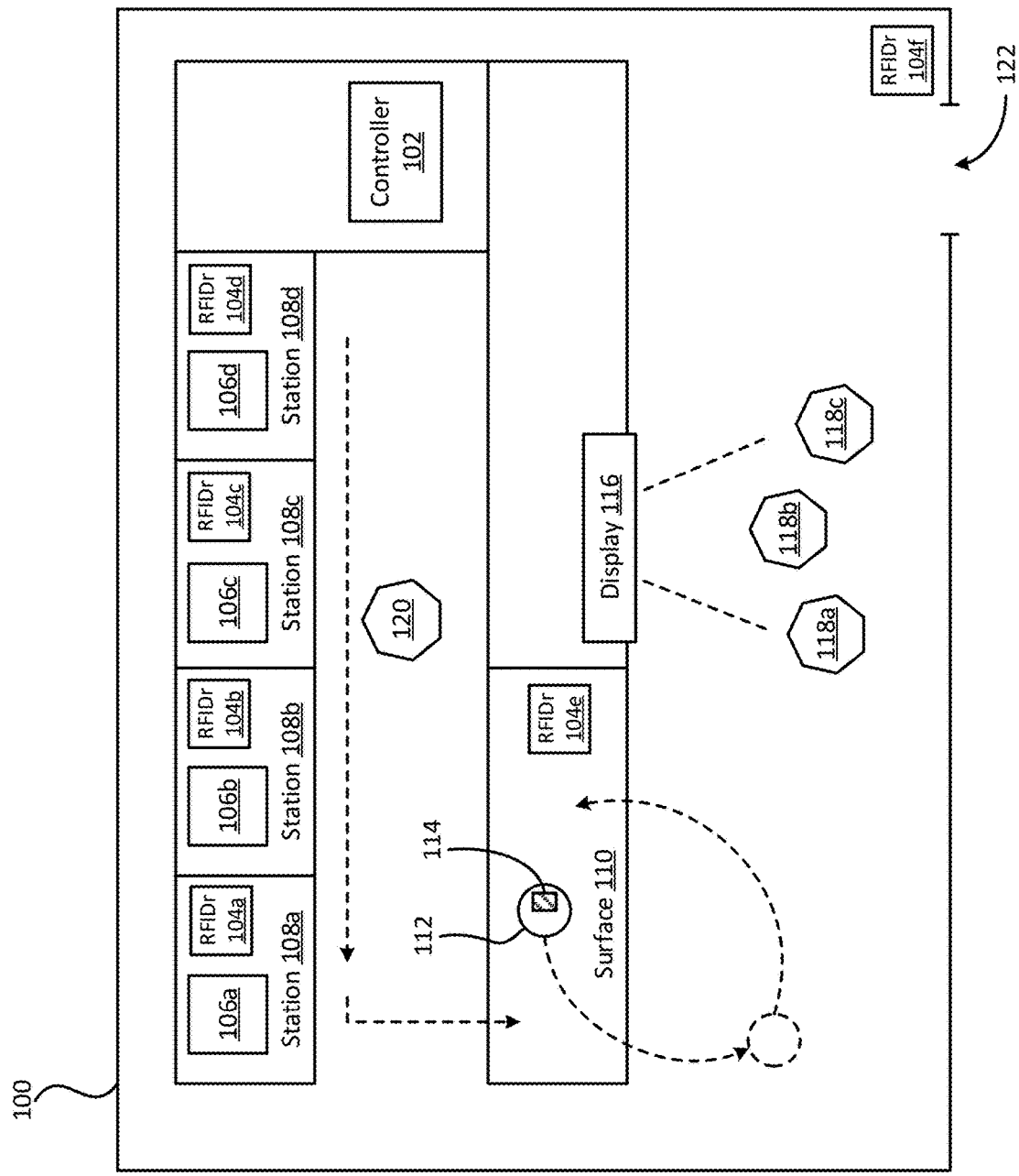
FIG. 1 shows a top-down view of an example of a location with an intelligent and automated RFID-based control system for a display according to some aspects of the present disclosure.

Certain aspects and features of the present disclosure relate to a control system that automatically controls the content of a display based on sensor signals from one or more radio frequency identification (RFID) readers. The RFID readers can be positioned in various locations. As a container with an RFID tag comes within range of the RFID readers, the control system can automatically update the content of the display based on which RFID reader detected the RFID tag. Because different containers can have different RFID tags, the RFID readers can be used to track the current position or status of each of the containers at any given point in time and the display can be automatically updated in real time to reflect the same. A viewer can observe the display to track the real-time location or status of a container-of-interest.

Traditional display systems often face challenges related to the timely and accurate updating of display content, particularly in dynamic environments where the status or location of items can frequently change. Manual intervention is typically required to ensure that the displayed information remains current, which can introduce delays and errors. Additionally, conventional systems may lack the capability to provide real-time updates based on the precise movement and status of individual items. The intelligent and automated RFID-based control system described herein addresses these technical problems by leveraging RFID technology to automatically and instantaneously update display content. This system eliminates the need for manual updates by using RFID readers to detect the presence and movement of tagged containers, thereby providing real-time, accurate information on the display. The automation and intelligence introduced by this system significantly enhance the efficiency and reliability of display updates, ensuring that viewers are always presented with the most current and relevant information without delay or error.

In some examples, the control system can employ timing thresholds to determine the appropriateness of updating the display with specific content. For instance, when the control system detects a container (e.g., via its RFID tag) within the range of an RFID reader, it can automatically update the display to include content associated with that container. If, subsequently, the control system no longer detects the container—due to its movement beyond the RFID reader's range—the display can be automatically updated to remove the associated content. Should the control system later re-detect the container within the specified area, it can assess the duration for which the container was absent. If this duration is below a predefined threshold, the control system can reinstate the content on the display, presuming the container was inadvertently removed. Conversely, if the absence duration meets or exceeds the threshold, the control system can refrain from updating the display with the associated content, assuming the removal was deliberate.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a top-down view of an example of a location 100 with an intelligent and automated RFID-based control system for a display 116 according to some aspects of the present disclosure. In this example, the location 100 includes a container 112, such as a cup, box, or bag. The container 112 may include a beverage, a food item, a toy, circuitry or circuit component, computer component, etc. The container 112 may also include an RFID tag 114. That is, the RFID tag 114 can be attached to the container 112. For example, the RFID tag 114 can be stuck (e.g., with glue or adhesive) or stapled to an exterior or interior wall of the container 112. As another example, the RFID tag 114 can be embedded within a wall of the container 112. As yet another example, the RFID tag 114 can be disposed within an interior of the container 112. The RFID tag 114 can be unique to the container 112 such that the RFID tag 114 can uniquely identify the container 112 from other containers at the location 100. In some examples, the RFID tag 114 can be attached to the container 112 by a worker 120 at the location 100, which may in some examples be a store, café, warehouse, etc.

Once the container 112 is ready to be provided to a recipient 118—e.g., because the worker 120 finished preparing the contents of the container 112—the container 112 can be placed on a surface 110, such as a delivery surface (e.g., a countertop). The surface 110 may serve as a handoff plane for providing such containers to waiting recipients 118.

In some examples, there can be an RFID reader 104e ("RFIDr") associated with the surface 110. For example, the RFID reader 104e can be positioned on the surface 110, under the surface 110, above the surface 110, or within the surface 110. In response to the container 112 coming within range of the RFID reader 104e, the RFID reader 104e can transmit a sensor signal to a controller 102 of the control system. The sensor signal can include a unique identifier of the RFID tag 114 associated with the container 112. The unique identifier may be a numerical value assigned to the RFID tag 114 to differentiate it from other RFID tags.

In some examples, the controller 102 can receive the sensor signal from the RFID reader 104e and responsively determine display content that is associated with the unique identifier of the RFID tag 114. Display content is content to be output on a display 116. In some examples, the display content may be a name or other identifier of a recipient of the container 112. To determine the display content, the controller 102 may access a predefined mapping that correlates the unique identifier of the RFID tag to the display content. The controller 102 can then use the mapping to determine the display content based on the unique identifier. In some examples, the display content may have previously been specified by the recipient, for instance upon placing an order associated with the container 112.

After determining the display content, the controller 102 can transmit a display signal to a display 116 positioned at the location 100 to automatically update the display 116 with the display content. The display 116 may be oriented toward one or more recipients 118 of containers. Upon viewing the display content on the display 116, a recipient 118a may obtain the container 112 from the surface 110. For example, the recipient 118a may pick up the container 112 from the surface 110 and walk away.

When the container 112 leaves the range of the RFID reader 104e, the RFID reader 104e may no longer detect the RFID tag 114. In response to the RFID reader 104e no longer detecting the RFID tag 114, the RFID reader 104e can transmit another sensor signal to the controller 102. The controller 102 can receive the sensor signal from the RFID reader 104e and, in response, determine the display content that is associated with the unique identifier of the RFID tag 114. After determining the display content, the controller 102 can transmit another display signal to the display 116 to automatically remove the display content from the display 116. For instance, if the display content is the name of the recipient of the container 112, the recipient's name can be automatically removed from the display 116 once they obtain the container 112 from the surface 110. By automatically outputting and removing the display content, the controller 102 can prevent errors and delays in updating the display 116. This can be particularly advantageous at busy times of day when dozens or hundreds of recipients (e.g., customers) may obtain containers from the location 100.

In some examples, a recipient 118a may accidentally take the wrong container 112 from the surface 110. After removing the container 112 from the surface 110, the recipient 118a may realize the error (e.g., by reading a name tag on the container 112) and return the container 112 to the surface 110. In some examples, the control system can automatically account for these kinds of accidents. For instance, the controller 102 can determine a first time associated with the removal of the container 112 from the surface 110. The controller 102 may determine the first time based on a first sensor signal from the RFID reader 104e indicating that the container 112 (e.g., its tag 114) is no longer within range of the RFID reader 104e. The controller 102 can also determine a second time associated with the return of the container 112 to the surface 110. The controller 102 may determine the second time based on a second sensor signal from the RFID reader 104e indicating that the container 112 is within range of the RFID reader 104e. The controller 102 can then determine a time difference between the first time and the second time. The controller 102 can compare the time difference to a predefined threshold, such as 30 seconds. If the time difference is below the predefined threshold, then it is likely the container 112 was taken by mistake. So, the controller 102 can transmit a display signal to the display 116 for causing the display 116 to again output the display content. Otherwise, it may mean that the container 112 was deliberately taken and returned for another reason. For instance, the recipient 118a may have consumed the contents of the container 112 and returned the empty container 112 to the surface 110 for disposal by the worker 120. So, the controller 102 may forego transmitting the display signal and thus not reinstate the display content on the display 116.

In some examples, the control system can also track the construction of an item in the container 112 using RFID readers 104a-d positioned at stations 108a-d of the location 100. There can be any number of stations 108a-d that collectively form an item construction pathway for creating an item (e.g., a beverage, food item, toy, etc.) to be provided in a container 112 to a recipient 118a. Each of the stations 108a-d can be configured for performing a distinct step in the overall construction process of the item and may have corresponding equipment 106a-d to perform said step. Examples of such equipment 106a-d may include mixers, shakers, coffee machines, conveyor belts, ice machines, fluid dispensers, foam dispensers, refrigerators, presses, cutters and cutting machines, etc. As the container 112 makes its way to various stations 108a-d in the item construction pathway, the RFID readers 104a-d at the respective stations can detect the container's RFID tag 114 and responsively transmit corresponding sensor signals to the controller 102. The controller 102 can receive each of the sensor signals, determine the current location (e.g., station) of the container 112 along the pathway at a given point in time based on the sensor signals, and automatically update the display 116 to indicate the current status of the container 112 in the construction process based on its current location. For example, if the item construction pathway extends from the right of the figure to the left of the figure (as represented by the dashed arrow), and the container 112 is at any of the first three stations 108b-d in the item construction pathway, then the controller 102 may update the display 116 to say "John—In Preparation," where "John" is the name of the recipient and "In Preparation" is the current status of his item. When the container 112 arrives at the final station 108a in the item construction pathway, the controller 102 may update the display 116 to say "John-Finishing Up," where "Finishing Up" is the current status of his item. When the container 112 arrives at the surface 110 after being completed, the controller 102 may update the display 116 to say "John-Ready," where "Ready" is the current status of his item. Thus, the progress can be tracked and displayed in real time as the item is constructed and finally made available to the recipient 118a.

In some examples, the control system can adjust an expected delivery time of a second item based on the monitored progress of the container 112 through the item construction pathway. For example, the worker 120 may create a first item in the first container 112 by interacting with the various stations 108a-d in the item construction pathway. The same worker or a different worker may also create a second item. The second item may be associated with the first item. For example, the first and second items may be part of the same order. In one such example, the first item may be a beverage and the second item may be a food item, both of which may be part of the same order placed by a recipient 118*a*. The control system may adjust an expected delivery time of the first item, the second item, and/or the entire order based on the monitored progress of the first item (in the container) through the item construction pathway. The control system can then output the adjusted expected delivery time to the recipient 118*a*.

In some examples, it may be desirable to provide all of the items in the order to the recipient 118*a* at around the same time, such as within a few seconds of one another. So, the control system may automatically adjust (e.g., throttle or accelerate) the creation of the second item based on detecting a change (e.g., slowdown or acceleration, respectively) in the creation of the first item, or vice-versa, so that the delivery of the two items is substantially synchronized. For instance, the controller 102 can automatically transmit control signals to the equipment 106*a-d* involved in the creation of the second item to adjust the timing of certain steps of its creation process, in an effort to synchronize its creation with the creation of the first item. As one particular example, the controller 102 may cause the second item to cook at a lower temperature for a longer period of time to elongate its creation time, in an effort to synchronize its creation with that of a beverage that is taking longer than expected (e.g., a predefined expected creation time). Additionally, in some examples the control system may increase or decrease an expected delivery time associated with the first item and/or the second item based on the progress of the other item. For instance, the control system can automatically and repeatedly adjust the expected delivery time of the second item based on the real-time progress of the first item through the item construction pathway.

In some examples, the location 100 can also have an RFID reader 104*f* positioned near an exit 122 of the location 100 (e.g., a building). This may allow the system to track when the container 112 leaves the location 100. For example, the controller 102 can receive a sensor signal from the RFID reader 104*f* indicating a leave event. Such a leave event may occur when the recipient 118*a* walks through the exit 122 to leave the location 100. Information about the leave event may be stored in a log for future reference. For example, the controller 102 may store a date and time associated with the leave event in a log entry. Additionally or alternatively, the controller 102 may compute the amount of time that the container 112 remained at the location 100, after it was finished being prepared by the worker 120, which may provide valuable insights. For instance, the controller 102 can determine a first time associated with the container 112 being placed on the surface 110. The controller 102 can also determine a second time associated with the container 112 leaving the location 100. The first time may be determined based on when the RFID reader 104*a* detected the container 112, and the second time may be determined based on when the RFID reader 104*f* detected the container 112. The controller 102 can then determine a difference between the first time and the second time, where the time difference represents how long the container 112 remained in the location 100 after it was placed on the surface 110. This may provide valuable information, such as whether recipients pick up their containers and leave immediately or if they instead remain in the location 100 and make use of its other facilities.

It will be appreciated that the above processes can be applied to any number of containers simultaneously. For example, the controller 102 can simultaneously track as many containers (e.g., RFID tags) as are actively present within range of the RFID reader 104*e* and update the display 116 accordingly. Likewise, the controller 102 can simultaneously track as many containers as are actively present within range of the RFID readers 104*a-d* and update the display 116 accordingly. Each single RFID reader can be used to concurrently track multiple containers within its range.

Figure 2:
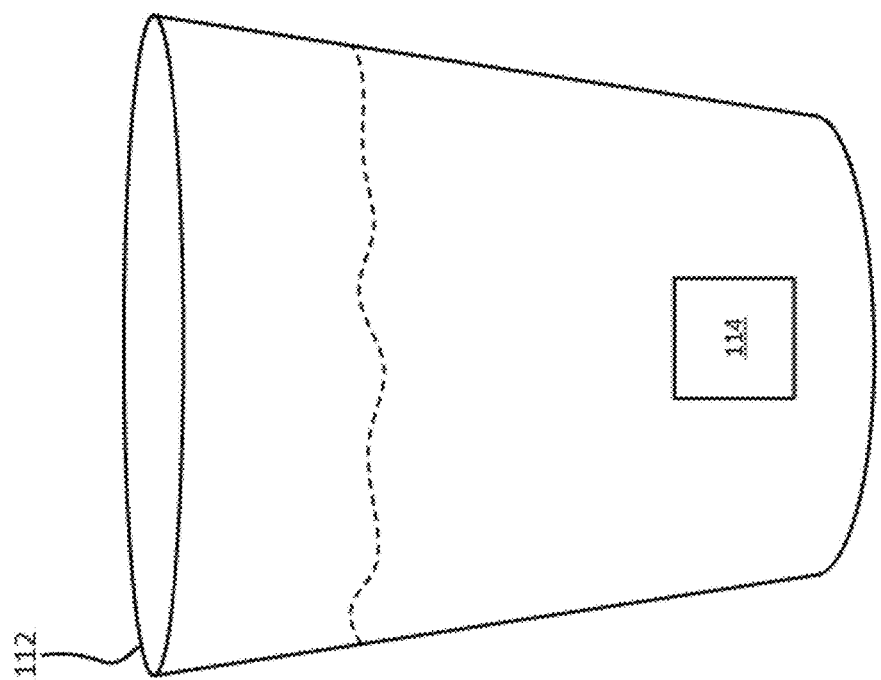
FIG. 2 shows an example of a container with an RFID tag according to some aspects of the present disclosure.

Turning now to FIG. 2, shown is an example of a container 112 with an RFID tag 114 according to some aspects of the present disclosure. In this example, the container 112 is a cup for holding a beverage. The RFID tag 114 is affixed to the side of the cup (e.g., with an adhesive). In other examples, the container 112 may be a bag, a box, or another type of receptacle. The container 112 may be manufactured with the RFID tag 114 attached thereto (e.g., embedded therein). Alternatively, the RFID tag 114 can be attached to the container 112 after it has been delivered to a distributor or other entity, for example a store location.

Figure 3:
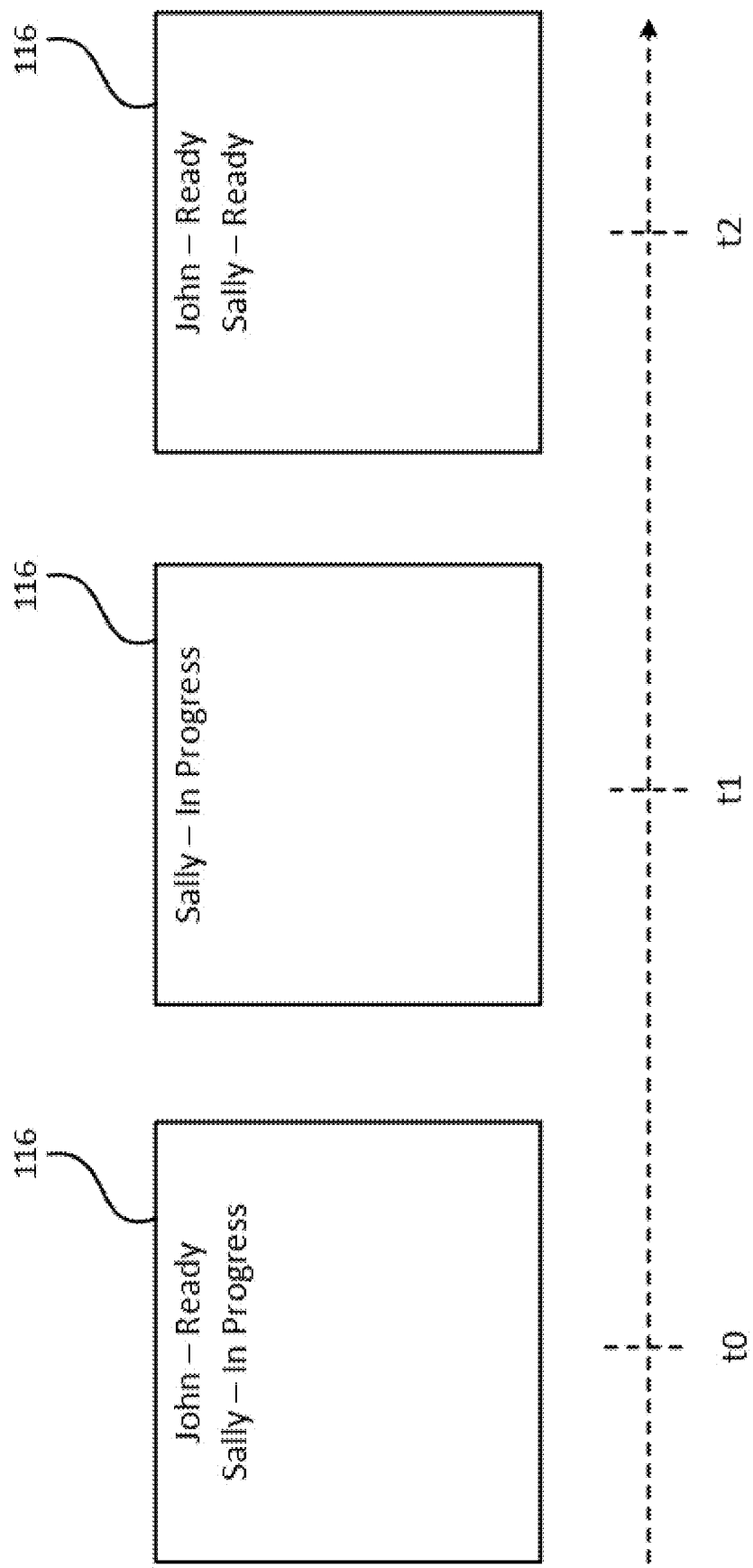
FIG. 3 shows an example of display changes over time according to some aspects of the present disclosure.

Turning now to FIG. 3, shown is an example of display changes over time according to some aspects of the present disclosure. The content of the display can be automatically changed by a control system based on the locations of one or more containers as detected by one or more RFID readers.

In this example, at time t0, the controller can receive a first sensor signal from an RFID reader (e.g., RFID reader 104*e* of FIG. 1). The first sensor signal indicates that a container associated with "John" is within range of the RFID reader. Because the RFID reader is positioned proximate to a surface, the first sensor signal can indicate that the container is positioned on or near the surface. Based on receiving the first sensor signal, the controller can transmit a first display signal for causing the name "John" and the status "Ready" to be output on the display 116.

At time t1, the container may be removed from the surface and taken out of range of the RFID reader. This may cause the RFID reader to transmit a second sensor signal to the controller. The second sensor signal can indicate that the container is no longer in range of the RFID reader and, thus, no longer positioned on or near the surface. Based on receiving the second sensor signal, the controller can transmit a second display signal for causing the name "John" and the status "Ready" to be removed from the display 116.

At time t2, the container may be returned to the surface and, thus, be brought back within the range of the RFID reader. This may cause the RFID reader to transmit a third sensor signal to the controller. The third sensor signal can indicate that the container has been again positioned on or near the surface. Based on receiving the third sensor signal, the controller can transmit a third display signal for causing the name "John" and the status "Ready" to be returned to the display 116. Using this process, if the container is accidentally removed from the surface and then returned, the controller can modify the displayed content accordingly.

Figure 4:
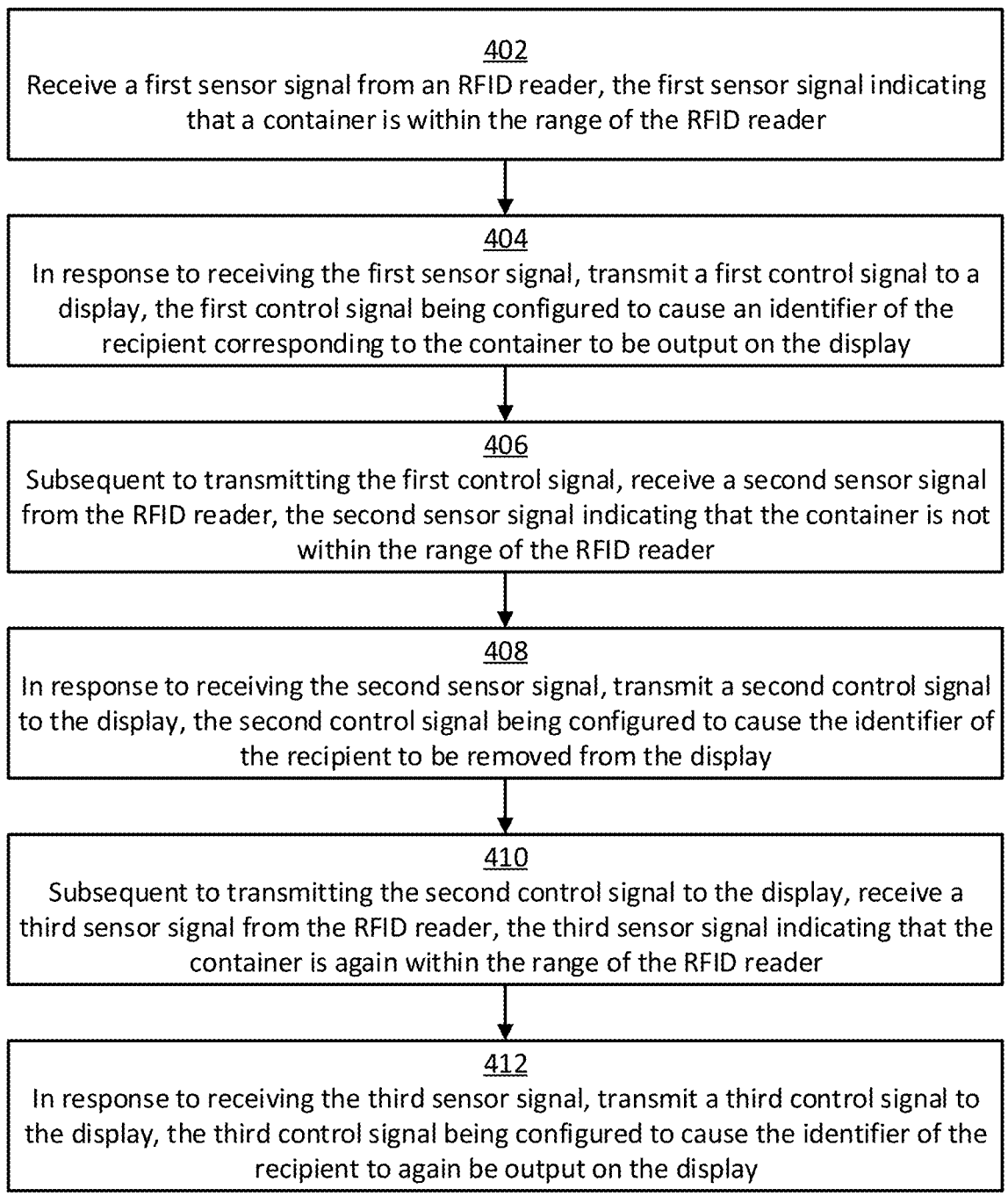
FIG. 4 shows a flow chart of an example of a process that can be performed by an RFID-based control system according to some aspects of the present disclosure.

FIG. 4 shows a flow chart of an example of a process that can be performed by an RFID-based control system according to some aspects of the present disclosure. Other example may involve more operations, fewer operations, different operations, or a different sequence of operations than is shown. The operations of FIG. 4 are described below with reference to the components of FIGS. 1-3 described above.

In block 402, a control system (e.g., controller 102) receives a first sensor signal from an RFID reader 104*e*. The RFID reader 104*e* can be associated with a surface 110 on which a container 112 is positionable for delivery to (e.g., pickup by) a recipient 118*a*. For example, the RFID reader 104*e* may be positioned on or in the surface 110. In some examples, the RFID reader 104*e* may be sized to span all or substantially all (e.g., greater than 90% of) the surface area of the surface 110. For instance, the RFID reader 104e may be a rigid or flexible pad that can be laid on top of the surface 110. The pad can have a length and/or width that is substantially equal to that of the surface 110. In that arrangement, the containers may be positioned (e.g., placed) on top of the pad for delivery to recipients.

The first sensor signal can indicate that the container 112 is within the range of the RFID reader 104e. The range of the RFID reader 104e may be specifically configured to be relatively small (e.g., 1-2 feet) so that the RFID reader 104e only detects the container 112 when it is positioned on or near the surface 110.

In block 404, the control system, in response to receiving the first sensor signal, transmits a first control signal to a display 116. The first control signal can cause an identifier (e.g., name, address, phone number, number, or letter) of the recipient 118a corresponding to the container 112 to be output on the display 116. The identifier may be provided by the recipient 118a, in some examples. The recipient 118a may have provided the identifier prior to the start of the creation process for the item in the container 112. A status (e.g., "Ready") associated with the container 112 may also be output on the display 116. The status may be determined based on the first sensor signal.

In block 406, the control system, subsequent to transmitting the first control signal, receives a second sensor signal from the RFID reader 104e. The second sensor signal can indicate that the container 112 is not within range of the RFID reader 104e. For example, the second sensor signal can include a list of the unique identifiers of all RFID tags within its range and, thus, the absence of the unique identifier corresponding to the RFID tag 114 of the container 112 from the list can signal to the control system that the container 112 is no longer within range of the RFID reader 104e.

In block 408, the control system, in response to receiving the second sensor signal, transmits a second control signal to the display 116. The second control signal can cause the identifier of the recipient 118a to be removed from the display 116. If a status is also displayed in conjunction with the recipient 118a, the status may also be removed from the display 116.

In block 410, In the control system, subsequent to transmitting the second control signal, receives a third sensor signal from the RFID reader 104e. The third sensor signal can indicate that the container 112 is within range of the RFID reader 104e. For example, the third sensor signal can include a list of the unique identifiers of all RFID tags within its range and, thus, the presence of the unique identifier corresponding to the RFID tag 114 of the container 112 on the list can signal to the control system that the container 112 is within range of the RFID reader 104e.

In block 412, the control system, in response to receiving the third sensor signal, transmits a third control signal to the display 116. The third control signal can cause the identifier of the recipient 118a to be returned to the display 116. The status associated with the container may also be returned to the display. In some examples, block 412 may only be performed if the time difference between when the container 112 left the range of the RFID reader 104e and re-entered the range of the RFID reader 104e is less than a predefined threshold.

Figure 5:
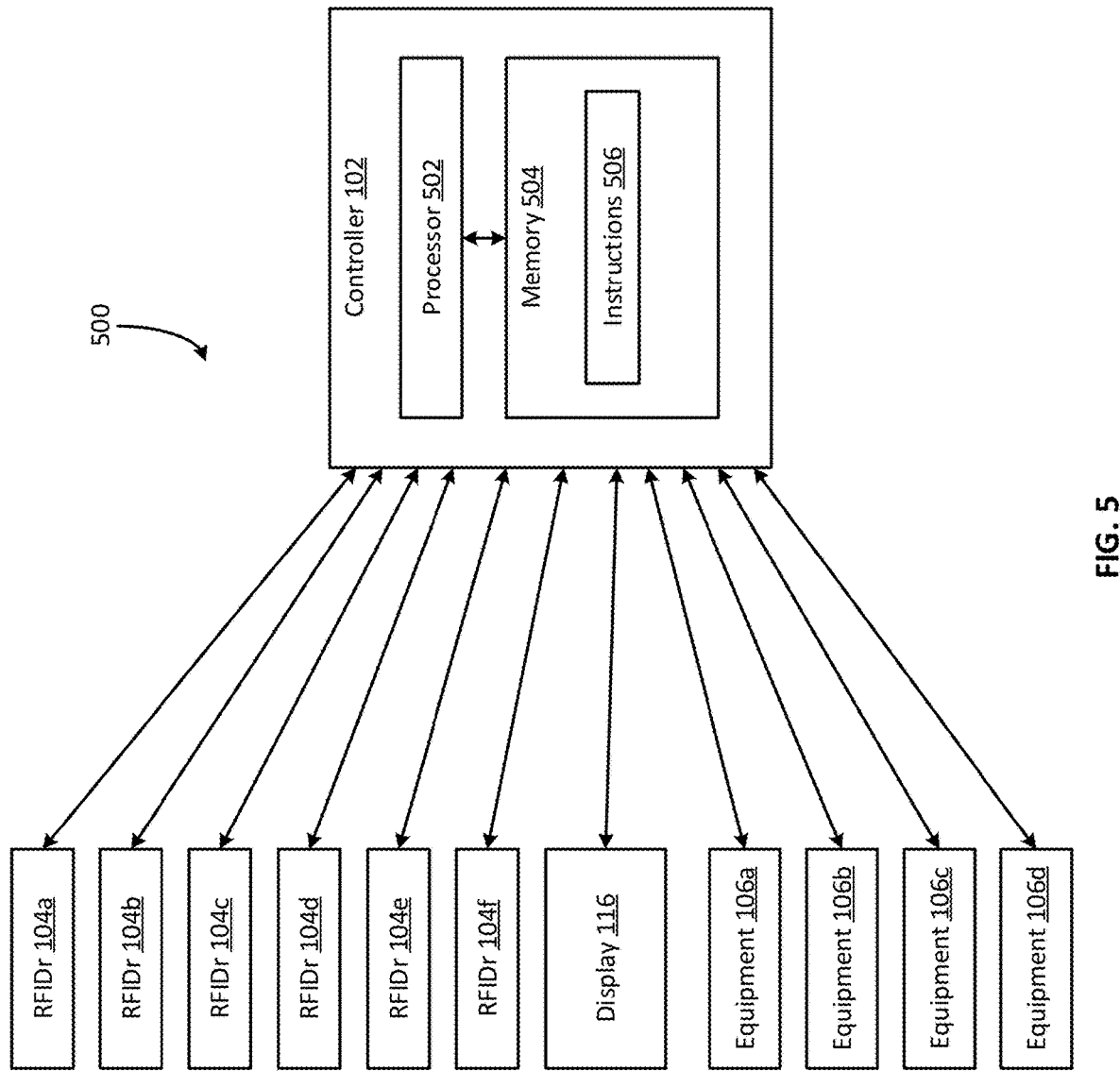
FIG. 5 shows a block diagram of an example of an intelligent and automated RFID-based control system for a display according to aspects of the present disclosure.

FIG. 5 shows a block diagram of an example of an intelligent and automated RFID-based control system 500 for a display according to aspects of the present disclosure. The control system 500 includes a controller 102, which in turn includes a processor 502 communicatively coupled to a memory 504 by a bus. The processor 502 can include one processing device or multiple processing devices. Non-limiting examples of the processor 502 include a Field-Programmable Gate Array (FPGA), an application-specific integrated circuit (ASIC), a microprocessor, or any combination of these. The processor 502 can execute instructions 506 stored in the memory 504 to perform operations, such as any of the operations described above with respect to the controller 102. In some examples, the instructions 506 can include processor-specific instructions generated by a compiler or an interpreter from code written in any suitable computer-programming language, such as C, C++, C#, Python, or Java.

The memory 504 can include one memory device or multiple memory devices. The memory 504 can be volatile or non-volatile, such that the memory 504 retains stored information when powered off. Non-limiting examples of the memory 504 include electrically erasable and programmable read-only memory (EEPROM), flash memory, or any other type of non-volatile memory. At least some of the memory device can include a non-transitory computer-readable medium from which the processor 502 can read the instructions 506. A computer-readable medium can include electronic, optical, magnetic, or other storage devices capable of providing the processor 502 with computer-readable instructions or other program code. Non-limiting examples of a computer-readable medium can include magnetic disks, memory chips, ROM, random-access memory (RAM), an ASIC, a configured processor, optical storage, or any other medium from which a computer processor can read the instructions 506.

The controller 102 can be communicatively coupled to one or more RFID readers 104a-e, a display 116, and/or equipment 106a-d. For example, the controller 102 can be in wired or wireless communication with the aforementioned components. In some examples, the controller 102 can be in communication with the RFID readers 104a-e, displays 116, and equipment 106a-d via one or more networks. Examples of the networks can include a private network such as a local area network, a public network such as the Internet, or a combination thereof. The controller 102 can receive sensor signals from the RFID readers 104a-f. Based on the sensor signals, the controller 102 can transmit control signals to the display 116 and the equipment 106a-d, for example to implement any of the functionality described above.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
    a container with a radio frequency identification (RFID) tag;
    a display;
    a surface on which the container is positionable for conveyance to a recipient;
    an RFID reader associated with the surface, the RFID reader being configured to read the RFID tag of the container when the container is in range of the RFID reader; and a processor coupled to the RFID reader and the display, the processor being configured to execute operations including:
- receiving a first sensor signal from the RFID reader, the first sensor signal indicating that the container is within the range of the RFID reader;
- in response to receiving the first sensor signal, transmitting a first control signal to the display, the first control signal being configured to cause an identifier of the recipient corresponding to the container to be output on the display;
- subsequent to transmitting the first control signal, receiving a second sensor signal from the RFID reader, the second sensor signal indicating that the container is not within the range of the RFID reader;
- in response to receiving the second sensor signal, transmitting a second control signal to the display, the second control signal being configured to cause the identifier of the recipient to be removed from the display;
- subsequent to transmitting the second control signal to the display, receiving a third sensor signal from the RFID reader, the third sensor signal indicating that the container is again within the range of the RFID reader; and
- in response to receiving the third sensor signal, transmitting a third control signal to the display, the third control signal being configured to cause the identifier of the recipient to again be output on the display.

2. The system of claim 1, wherein the RFID reader is positioned on or in the surface.

3. The system of claim 1, wherein the container is a cup that includes a beverage.

4. The system of claim 1, wherein the container includes a food item.

5. The system of claim 1, wherein the operations further comprise:
- determining a first time associated with the container being removed from the surface;
- determining a second time associated with the container being returned to the surface after being removed from the surface;
- determining a time difference between the first time and the second time;
- determining that the time difference is below a predefined threshold; and
- in response to determining that the time difference is below the predefined threshold, transmitting the third control signal to the display.

6. The system of claim 5, wherein the first time is determined based on the second sensor signal, and wherein the second time is determined based on the third sensor signal.

7. The system of claim 1, wherein the RFID reader is a first RFID reader, and further comprising a second RFID reader positioned proximate to an exit of a building containing the surface, wherein the operations further comprise:
- receiving a fourth sensor signal from the second RFID reader, the fourth sensor signal indicating that the container is within range of the second RFID reader;
- based on the fourth sensor signal, determining an amount of time between when the container was detected by the first RFID reader and when the container was detected by the second RFID reader; and
- storing a log entry indicating the amount of time, the amount of time representing how long the container remained in the building after the container was placed on the surface.

8. The system of claim 1, further comprising a plurality of RFID readers positioned at different stations along an item construction pathway, wherein the operations further comprise:
- monitoring the progress of the container through the different stations of the item construction pathway based on sensor signals from the plurality of RFID readers positioned at the different stations, the container being associated with a first item;
- adjusting an expected delivery time of a second item based on the monitored progress of the container, the second item being different than and associated with the first item; and
- outputting the adjusted expected delivery time for the second item to the recipient.

9. A computer-implemented method comprising:
- receiving a first sensor signal from an RFID reader that is associated with a surface on which a container is positioned for conveyance to a recipient, the first sensor signal indicating that the container is within the range of the RFID reader;
- in response to receiving the first sensor signal, transmitting a first control signal to a display, wherein the first control signal causes an identifier of the recipient corresponding to the container to be output on the display;
- subsequent to transmitting the first control signal, receiving a second sensor signal from the RFID reader, the second sensor signal indicating that the container is not within the range of the RFID reader;
- in response to receiving the second sensor signal, transmitting a second control signal to the display, wherein the second control signal causes the identifier of the recipient to be removed from the display;
- subsequent to transmitting the second control signal to the display, receiving a third sensor signal from the RFID reader, the third sensor signal indicating that the container is again within the range of the RFID reader; and
- in response to receiving the third sensor signal, transmitting a third control signal to the display, wherein the third control signal causes the identifier of the recipient to again be output on the display.

10. The method of claim 9, wherein the RFID reader is positioned on or in the surface.

11. The method of claim 9, wherein the container is a cup that includes a beverage.

12. The method of claim 9, wherein the container includes a food item.

13. The method of claim 9, further comprising:
- determining a first time associated with the container being removed from the surface;
- determining a second time associated with the container being returned to the surface after being removed from the surface;
- determining a time difference between the first time and the second time;
- determining that the time difference is below a predefined threshold; and
- in response to determining that the time difference is below the predefined threshold, transmitting the third control signal to the display.

14. The method of claim 13, wherein the first time is determined based on the second sensor signal, and wherein the second time is determined based on the third sensor signal.

15. The method of claim 9, wherein the RFID reader is a first RFID reader, and further comprising:
receiving a fourth sensor signal from a second RFID reader positioned proximate to an exit of a building containing the surface, the fourth sensor signal indicating that the container is within range of the second RFID reader;
based on the fourth sensor signal, determining an amount of time between when the container was detected by the first RFID reader and when the container was detected by the second RFID reader; and
storing a log entry indicating the amount of time, the amount of time representing how long the container remained in the building after the container was placed on the surface.

16. The method of claim 9, further comprising:
monitoring the progress of the container through different stations of an item construction pathway based on sensor signals from a plurality of RFID readers positioned at the different stations, the container being associated with a first item;
adjusting an expected delivery time of a second item based on the monitored progress of the container, the second item being different than and associated with the first item; and
outputting the adjusted expected delivery time for the second item to the recipient.

17. A non-transitory computer-readable medium comprising program code that is executable by one or more processors for causing the one or more processors to perform operations including:
receiving a first sensor signal from an RFID reader that is associated with a surface on which a container is positionable for conveyance to a recipient, the first sensor signal indicating that the container is within the range of the RFID reader;
in response to receiving the first sensor signal, transmitting a first control signal to a display, the first control signal being configured to cause an identifier of the recipient corresponding to the container to be output on the display;
subsequent to transmitting the first control signal, receiving a second sensor signal from the RFID reader, the second sensor signal indicating that the container is not within the range of the RFID reader;
in response to receiving the second sensor signal, transmitting a second control signal to the display, the second control signal being configured to cause the identifier of the recipient to be removed from the display;
subsequent to transmitting the second control signal to the display, receiving a third sensor signal from the RFID reader, the third sensor signal indicating that the container is again within the range of the RFID reader; and
in response to receiving the third sensor signal, transmitting a third control signal to the display, the third control signal being configured to cause the identifier of the recipient to again be output on the display.

18. The non-transitory computer-readable medium of claim 17, wherein the operations further comprise:
determining a first time associated with the container being removed from the surface;
determining a second time associated with the container being returned to the surface after being removed from the surface;
determining a time difference between the first time and the second time;
determining that the time difference is below a predefined threshold; and
in response to determining that the time difference is below the predefined threshold, transmitting the third control signal to the display.

19. The non-transitory computer-readable medium of claim 17, wherein the RFID reader is a first RFID reader, and wherein the operations further comprise:
receiving a fourth sensor signal from a second RFID reader positioned proximate to an exit of a building containing the surface, the fourth sensor signal indicating that the container is within range of the second RFID reader;
based on the fourth sensor signal, determining an amount of time between when the container was detected by the first RFID reader and when the container was detected by the second RFID reader; and
storing a log entry indicating the amount of time, the amount of time representing how long the container remained in the building after the container was placed on the surface.

20. The non-transitory computer-readable medium of claim 17, wherein the operations further comprise:
monitoring the progress of the container through different stations of an item construction pathway based on sensor signals from a plurality of RFID readers positioned at the different stations, the container being associated with a first item;
adjusting an expected delivery time of a second item based on the monitored progress of the container, the second item being different than and associated with the first item; and
outputting the adjusted expected delivery time for the second item to the recipient.

* * * * *